United States Patent
Lu et al.

(10) Patent No.: US 12,266,124 B2
(45) Date of Patent: Apr. 1, 2025

(54) STRUCTURED-LIGHT 3D SCANNING SYSTEM AND METHOD

(71) Applicant: Himax Technologies Limited, Tainan (TW)

(72) Inventors: Hsueh-Tsung Lu, Tainan (TW); Ching-Wen Wang, Tainan (TW); Cheng-Che Tsai, Tainan (TW); Wu-Feng Chen, Tainan (TW)

(73) Assignee: Himax Technologies Limited, Tainan (TW)

( * ) Notice: Subject to any disclaimer, the term of this patent is extended or adjusted under 35 U.S.C. 154(b) by 285 days.

(21) Appl. No.: 17/962,341

(22) Filed: Oct. 7, 2022

(65) Prior Publication Data

US 2024/0119613 A1 Apr. 11, 2024

(51) Int. Cl.
| | | |
|---|---|---|
| *G06T 7/521* | (2017.01) | |
| *G01B 11/25* | (2006.01) | |
| *G06T 5/00* | (2024.01) | |
| *G06T 5/70* | (2024.01) | |
| *G06T 5/77* | (2024.01) | |
| *G06T 9/00* | (2006.01) | |

(Continued)

(52) U.S. Cl.
CPC ............ *G06T 7/521* (2017.01); *G01B 11/254* (2013.01); *G06T 5/70* (2024.01); *G06T 5/77* (2024.01); *G06T 9/00* (2013.01); *G06V 10/145* (2022.01); *G06V 10/761* (2022.01); *G06V 10/803* (2022.01); *G06T 2207/10028* (2013.01); *G06T 2207/20182* (2013.01)

(58) Field of Classification Search
CPC .. G06V 10/147; G06V 10/803; G06V 10/751; G06V 10/145; G06T 5/77; G06T 5/70; G06T 7/521; G06T 9/00; G06T 2207/10028; G06T 2207/20182; G01B 11/254

See application file for complete search history.

(56) References Cited

U.S. PATENT DOCUMENTS 6,268,923 B1 * 7/2001 Michniewicz ..... G01B 11/2441
356/512
7,440,590 B1 * 10/2008 Hassebrook ......... G06V 10/145
359/263

(Continued)

FOREIGN PATENT DOCUMENTS

CN 109186493 A 1/2019

OTHER PUBLICATIONS

Office Action Dated Aug. 30, 2024 in corresponding Taiwan Patent Application No. 112127607.

*Primary Examiner* — Sang H Nguyen
(74) *Attorney, Agent, or Firm* — Donald E. Stout; Stout, Uxa & Buyan, LLP (57) ABSTRACT

A structured-light three-dimensional (3D) scanning system includes a projector that emits a projected light with a predetermined pattern onto an object; an image capture device that generates a captured image according to a reflected light reflected from the object, the predetermined pattern of the projected light being distorted due to 3D shape of the object, thereby resulting in a distorted pattern; a depth decoder that converts the distorted pattern into a depth map representing the 3D shape of the object; and a depth fusion device that generates a fused depth map according to at least two different depth maps associated with the object.

20 Claims, 6 Drawing Sheets

(51) Int. Cl.
   *G06V 10/145* (2022.01)
   *G06V 10/74* (2022.01)
   *G06V 10/80* (2022.01)

(56) References Cited

U.S. PATENT DOCUMENTS

| | | | |
|---|---|---|---|
| 10,805,549 B1 * | 10/2020 | Tsai | H04N 23/72 |
| 2007/0165246 A1 * | 7/2007 | Kimmel | G01B 11/2513 |
| | | | 356/610 |
| 2013/0153651 A1 * | 6/2013 | Fedorovskaya | G06K 5/00 |
| | | | 235/494 |
| 2013/0324875 A1 * | 12/2013 | Mestha | A61B 5/1077 |
| | | | 600/534 |
| 2016/0255332 A1 * | 9/2016 | Nash | H04L 1/0045 |
| | | | 348/46 |
| 2017/0277028 A1 * | 9/2017 | Short | G06T 7/521 |
| 2019/0007590 A1 | 1/2019 | Lee | |
| 2019/0247157 A1 * | 8/2019 | Wu | A61B 1/0638 |
| 2020/0286248 A1 * | 9/2020 | Shi | G06F 18/2431 |
| 2021/0058599 A1 | 2/2021 | Tech et al. | |
| 2021/0209778 A1 * | 7/2021 | Chan | G01S 17/894 |
| 2021/0248769 A1 | 8/2021 | Luo et al. | |
| 2021/0368206 A1 * | 11/2021 | Sugano | G06T 15/04 |

\* cited by examiner

STRUCTURED-LIGHT 3D SCANNING SYSTEM AND METHOD

BACKGROUND OF THE INVENTION

1. Field of the Invention

The present invention generally relates to a structured-light three-dimensional (3D) scanning system, and more particularly to a structured-light 3D scanning system with a depth fusion device.

2. Description of Related Art

A structured-light scanning system projects a known pattern (e.g., grids or horizontal bars) onto an object in a scene. The deform resulted from the light reflection may be analyzed to calculate the depth and surface information of the objects in the scene.

The conventional structured-light scanning system, while analyzing the deform resulted from the light reflection, usually encounters a dilemma of adopting a larger kernel of pixels with greater depth accuracy (but less resolution) or adopting a smaller kernel of pixels with larger resolution (but less depth accuracy).

A need has thus arisen to propose a novel scheme to overcome drawbacks of the conventional structured-light scanning system and to solve the dilemma as mentioned above.

SUMMARY OF THE INVENTION

In view of the foregoing, it is an object of the embodiment of the present invention to provide a structured-light 3D scanning system capable of generating a fused depth map that is more accurate than original depth maps with enhanced image quality.

According to one embodiment, a structured-light three-dimensional (3D) scanning system includes a projector, an image capture device, a depth decoder and a depth fusion device. The projector emits a projected light with a predetermined pattern onto an object. The image capture device generates a captured image according to a reflected light reflected from the object, the predetermined pattern of the projected light being distorted due to 3D shape of the object, thereby resulting in a distorted pattern. The depth decoder converts the distorted pattern into a depth map representing the 3D shape of the object. The depth fusion device generates a fused depth map according to at least two different depth maps associated with the object.

DETAILED DESCRIPTION OF THE INVENTION

Figure 1:
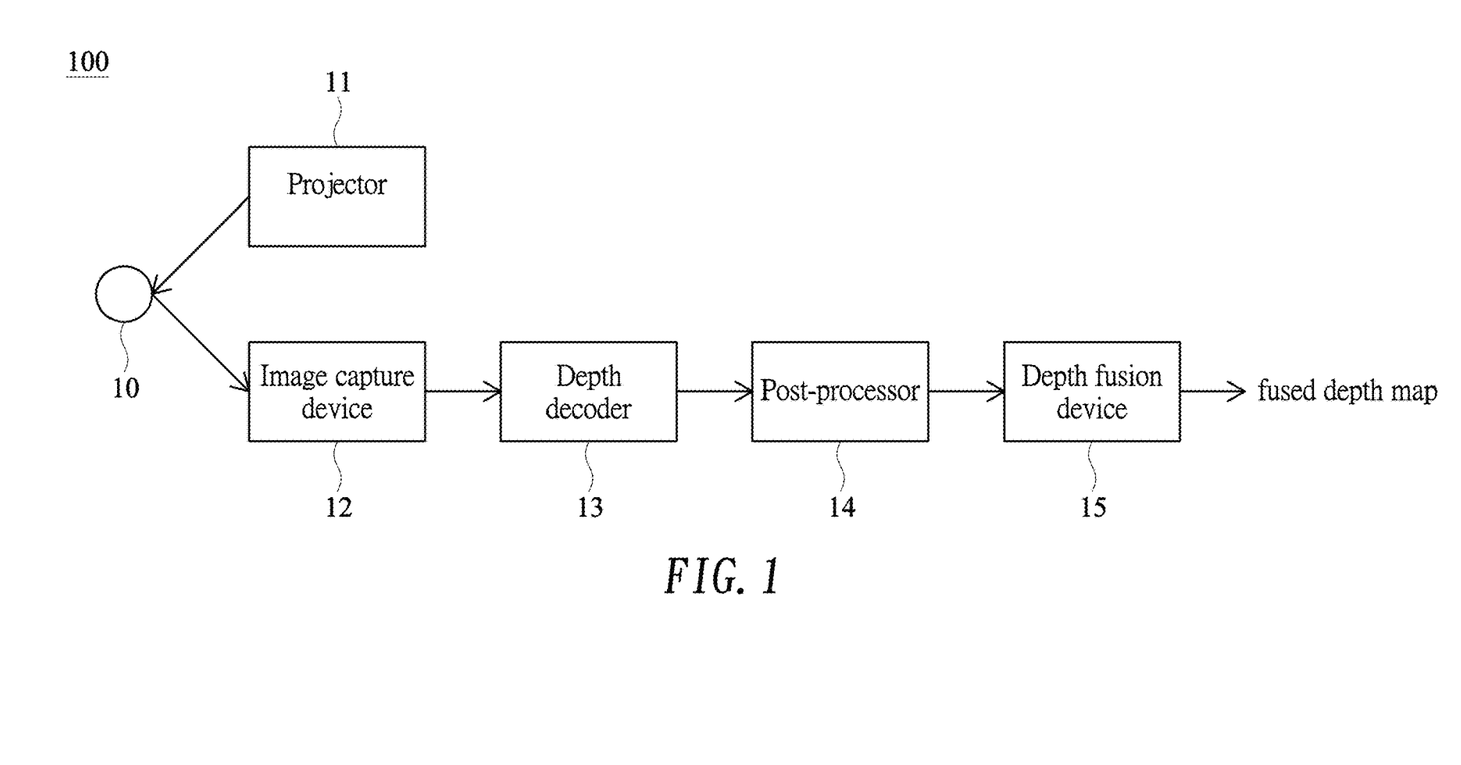
FIG. 1 shows a block diagram illustrating a structured-light three-dimensional (3D) scanning system according to one embodiment of the present invention.

FIG. 1 shows a block diagram illustrating a structured-light three-dimensional (3D) scanning system 100 according to one embodiment of the present invention.

Specifically, the structured-light 3D scanning system 100 ("system" hereinafter) may include a projector 11 configured to emit a (visible or invisible) projected light with a predetermined pattern (or ground truth) onto an object 10. The system 100 may include an image capture device 12, such as a camera, operatively coupled to receive a reflected light reflected from the object 10 and configured to capture an image, thereby generating a captured image (or raw image). It is noted that, while being reflected from the object 10, the predetermined pattern of the projected light may be geometrically distorted due to 3D shape of the object 10, thereby resulting in a distorted pattern.

In the embodiment, the system 100 may include a depth decoder 13 operatively coupled to receive the distorted pattern (on the captured image) and configured to convert (i.e., decode) the distorted pattern into an (original) depth map representing a 3D shape of the object 10.

Figure 2:
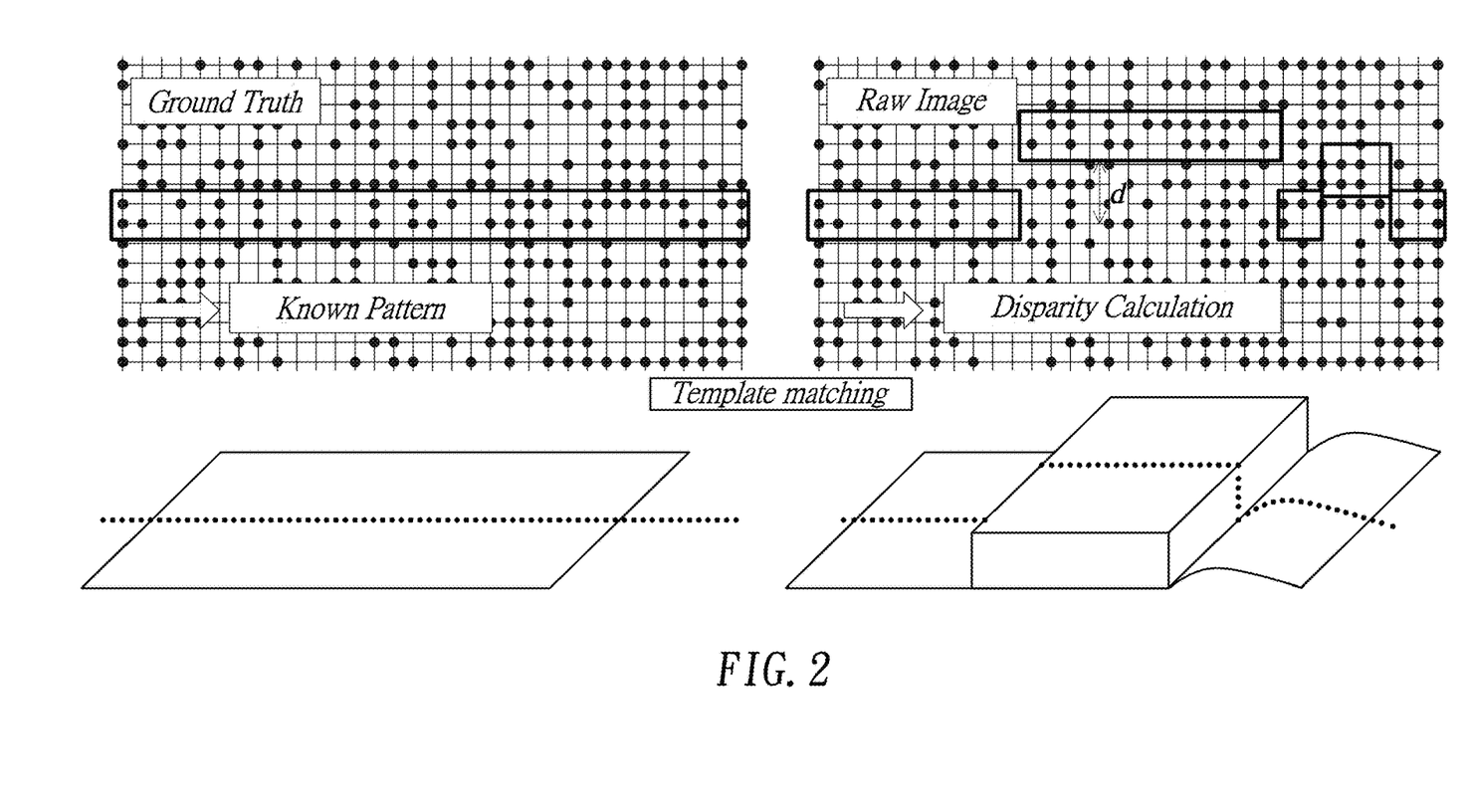
FIG. 2 shows a schematic diagram illustrating a process of decoding the distorted pattern of the captured image associated with the (3D) object according to the predetermined pattern associated with a flat (2D) surface.

FIG. 2 shows a schematic diagram illustrating a process of decoding the distorted pattern of the captured image (i.e., raw image) associated with the (3D) object 10 according to the predetermined (or known) pattern (i.e., ground truth) associated with a flat (2D) surface. Disparity (e.g., distance d) of some portions (as denoted by blocks) of the pattern between the raw image and the ground truth is then determined by template matching to obtain the depth map representing the depth and surface information of the object 10.

The system 100 of the embodiment may optionally include a post-processor 14 configured to process the captured image, after decoding by the depth decoder 13). For example, the post-processor 14 may be configured to remove noise from the captured image by applying (conventional) noise reduction algorithms, details of which are omitted for brevity. The post-processor 14 may be configured to fill holes inside hollow regions of the captured image by applying (conventional) hole filling algorithms, details of which are also omitted for brevity.

According to one aspect of the embodiment, the system 100 may include a depth fusion device 15 operatively coupled to receive at least two (original) depth maps associated with the object 10 and configured to generate a fused depth image, which is more accurate than the (original) depth maps (without sacrificing resolution), thereby enhancing image quality of the system 100. It is appreciated that more than two depth maps may be received and operated by the depth fusion device 15 in other embodiments.

Figure 3A:
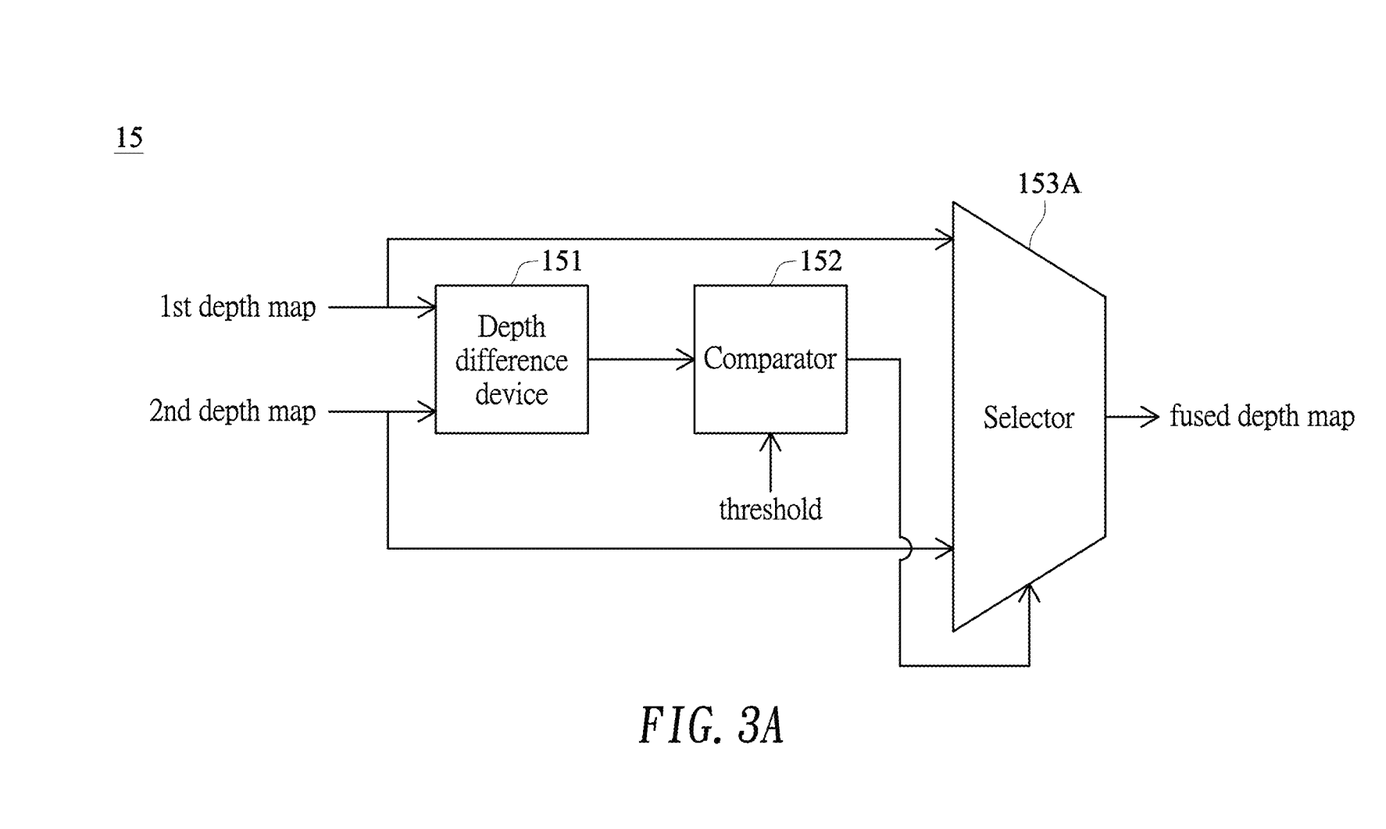
FIG. 3A shows a detailed block diagram illustrating the depth fusion device of FIG. 1 according to one embodiment of the present invention.
Figure 3B:
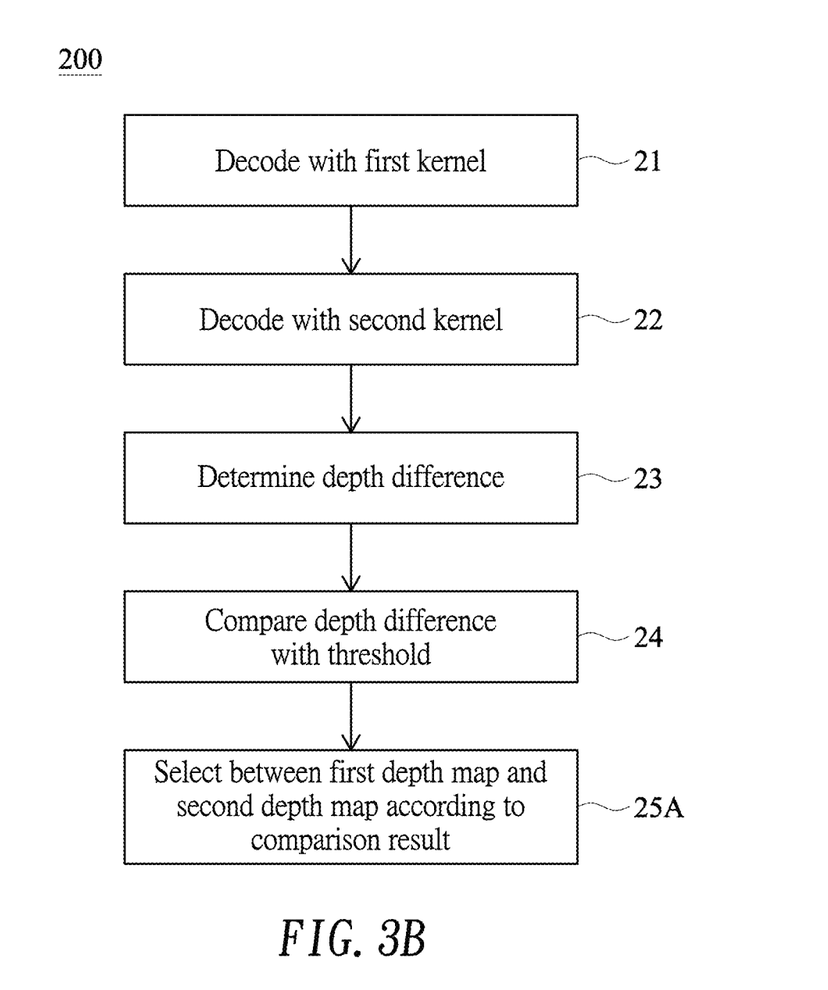
FIG. 3B shows a flow diagram illustrating a depth fusion method adaptable to the depth fusion device of FIG. 3A.

FIG. 3A shows a detailed block diagram illustrating the depth fusion device 15 of FIG. 1 according to one embodiment of the present invention, and FIG. 3B shows a flow diagram illustrating a depth fusion method 200 adaptable to the depth fusion device 15 of FIG. 3A.

In step 21, the depth decoder 13 decodes the captured image with a first kernel (also called window or mask) of pixels, thereby generating a first depth map. Next, in step 22, the depth decoder 13 decodes the captured image with a second kernel (of pixels) that is different from the first kernel in size, thereby generating a second depth map.

Specifically, the kernel, which is one type of spatial filter, may include a matrix. While decoding the captured image, a convolution may be performed between the kernel and the data (of the captured image). The convolution is a process of adding each element of the captured image to its local neighbors, weighted by the kernel as conventionally done and details of which are omitted for brevity.

In the embodiment, the depth fusion device 15 may include a depth difference device 151 configured to determine a depth difference between the first depth map and the second depth map at a pixel (under determination) (step 23).

The depth fusion device 15 of the embodiment may include a comparator 152 configured to compare the depth difference with a predetermined threshold, thereby resulting a comparison result (step 24). In one exemplary embodiment, the threshold is fixed. In another exemplary embodiment, the threshold is dynamically determined. For example, the threshold may be determined as a percentage (e.g., 1%) of a depth value of the pixel (under determination) on a corresponding depth map.

The depth fusion device 15 of the embodiment may include a selector 153A (e.g., multiplexer) configured to select between the first depth map and the second depth map at the pixel (under determination) according to the comparison result (of the comparator 152), thereby generating a fused depth value for the fused depth map at the pixel under determination (step 25A). In the embodiment, the selector 153A selects a depth value of a (first/second) depth map with larger kernel as the fused depth value for the fused depth map when the depth difference is greater than the predetermined threshold.

In addition to the kernel size, the selector 153A may perform selection based on other criteria. For example, the selector 153A may perform selection further based on confidence levels that are derived from the post-processor 14.

Figure 4A:
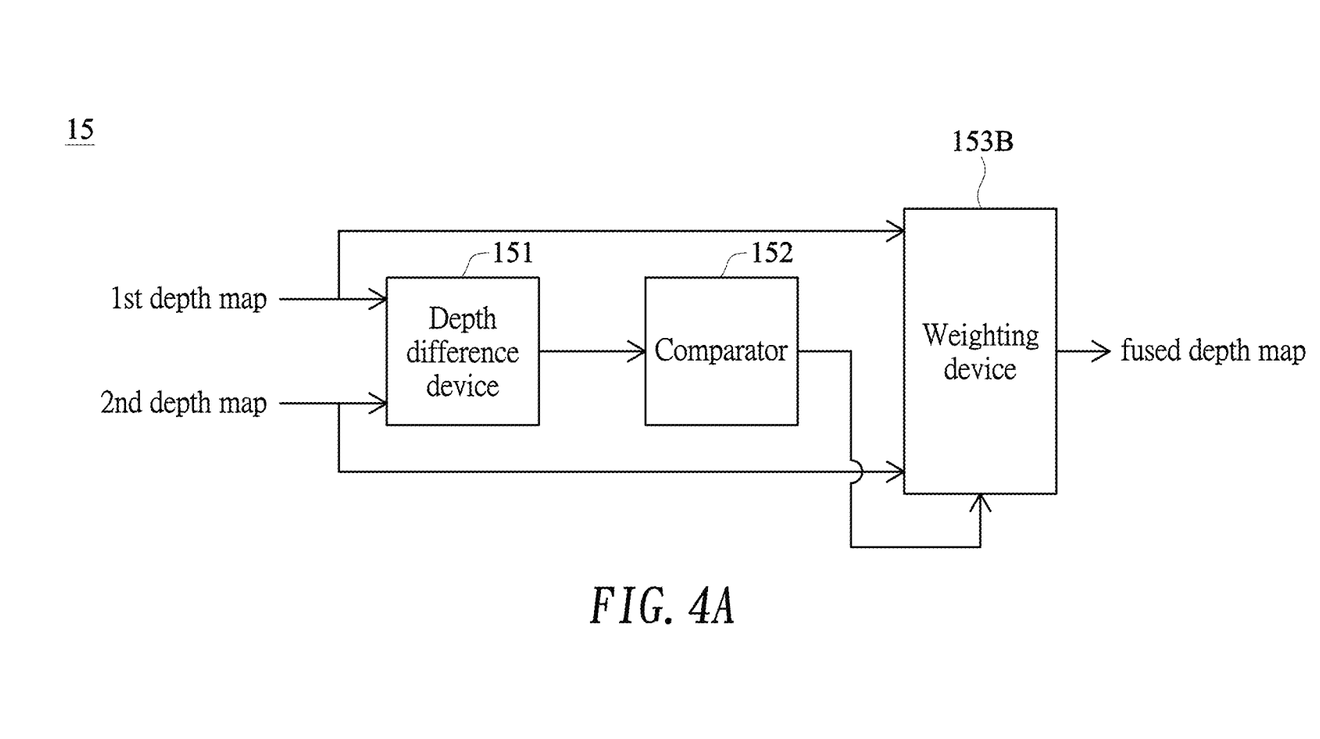
FIG. 4A shows a detailed block diagram illustrating the depth fusion device of FIG. 1 according to another embodiment of the present invention.
Figure 4B:
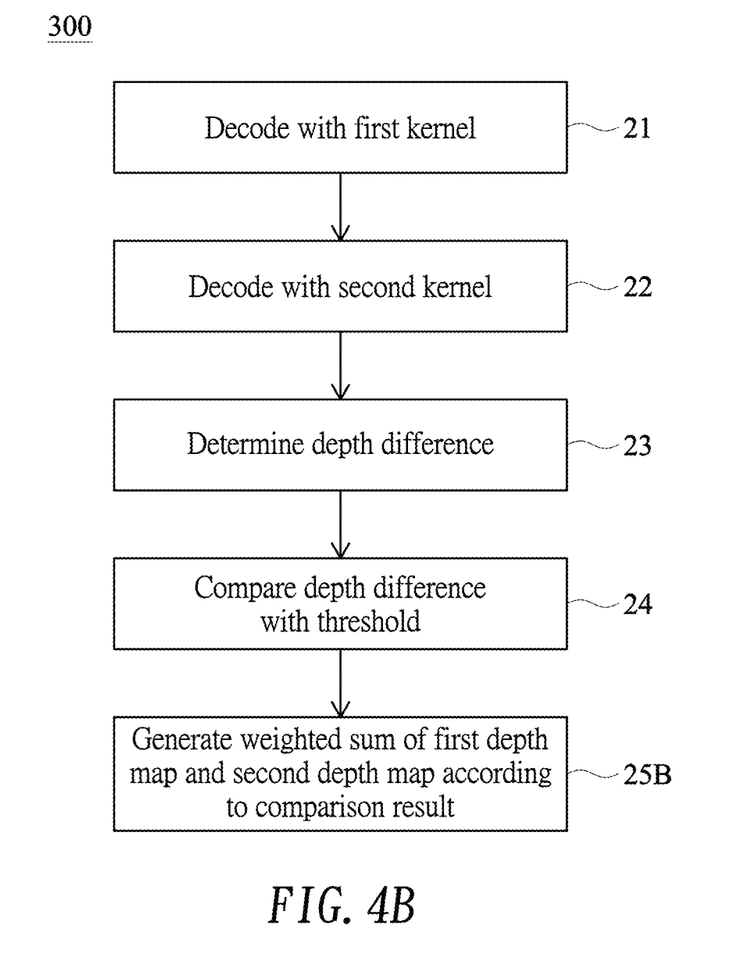
FIG. 4B shows a flow diagram illustrating a depth fusion method adaptable to the depth fusion device of FIG. 4A.

FIG. 4A shows a detailed block diagram illustrating the depth fusion device 15 of FIG. 1 according to another embodiment of the present invention, and FIG. 4B shows a flow diagram illustrating a depth fusion method 300 adaptable to the depth fusion device 15 of FIG. 4A.

The depth fusion device 15 of FIG. 4A is similar to the depth fusion device 15 of FIG. 3A, with the exceptions as described below.

In the embodiment, the depth fusion device 15 may include a weighting device 153B (that replaces the selector 153A of FIG. 3A) operatively coupled to receive the first depth map and the second depth map, and configured to generate a weighted sum of the first depth map and the second depth map at the pixel (under determination) according the comparison result (of the comparator 152), thereby generating a fused depth value for the fused depth map at the pixel under determination (step 25B). In the embodiment, the weighting device 153B adopts a larger weight for a (first/second) depth map with larger kernel when the depth difference is greater than the predetermined threshold.

Similar to the embodiment as depicted in FIG. 3A/3B, the weighting device 153B in the embodiment of FIG. 4A/4B may perform weighting further based on confidence levels that are derived from the post-processor 14.

Although specific embodiments have been illustrated and described, it will be appreciated by those skilled in the art that various modifications may be made without departing from the scope of the present invention, which is intended to be limited solely by the appended claims.

What is claimed is:

1. A structured-light three-dimensional (3D) scanning system, comprising:
   a projector that emits a projected light with a predetermined pattern onto an object;
   an image capture device that generates a captured image according to a reflected light reflected from the object, the predetermined pattern of the projected light being distorted due to 3D shape of the object, thereby resulting in a distorted pattern;
   a depth decoder that converts the distorted pattern of the captured image into a structured-light depth map representing the 3D shape of the object; and
   a depth fusion device that generates a fused depth map according to at least two different structured-light depth maps associated with the object;
   wherein the depth fusion device comprises a depth difference device that determines a depth difference between a first depth map and a second depth map at a pixel under determination for accordingly generating the fused depth map, the first depth map being generated by decoding a captured image with a first kernel and the second depth map being generated by decoding a captured image with a second kernel that is different from the first kernel.

2. The system of claim 1, further comprising:
   a post-processor that processes the captured image after decoding the captured image by the depth decoder but before generating the fused depth map.

3. The system of claim 2, wherein the post-processor removes noise from the captured image.

4. The system of claim 2, wherein the post-processor fills holes inside hollow regions of the captured image.

5. The system of claim 2, wherein the depth fusion device generates the fused depth map further according to confidence levels that are derived from the post-processor.

6. The system of claim 1, wherein the depth fusion device comprises:
   a comparator that compares the depth difference with a predetermined threshold, thereby resulting a comparison result.

7. The system of claim 6, wherein the depth fusion device further comprises:
   a selector that selects between the first depth map and the second depth map at the pixel under determination according to the comparison result, thereby generating a fused depth value for the fused depth map at the pixel under determination.

8. The system of claim 7, wherein the selector selects a depth value of a depth map with larger kernel as the fused depth value for the fused depth map when the depth difference is greater than the predetermined threshold.

9. The claim of claim 6, wherein the threshold is dynamically determined as a percentage of a depth value of the pixel under determination on a corresponding depth map.

10. The system of claim 6, wherein the threshold is fixed.

11. The system of claim 6, wherein the depth fusion device further comprises:
    a weighting device that generates a weighted sum of the first depth map and the second depth map at the pixel under determination according the comparison result.

12. The system of claim 11, wherein the weighting device adopts a larger weight for a depth map with larger kernel when the depth difference is greater than the predetermined threshold.

13. A structured-light three-dimensional (3D) scanning method, comprising:

emitting a projected light with a predetermined pattern onto an object;

generating a captured image according to a reflected light reflected from the object, the predetermined pattern of the projected light being distorted due to 3D shape of the object, thereby resulting in a distorted pattern;

decoding the captured image by converting the distorted pattern of the captured image into a structured-light depth map representing the 3D shape of the object; and generating a fused depth map according to at least two different structured-light depth maps associated with the object;

wherein the step of generating the fused depth map comprises determining a depth difference between a first depth map and a second depth map at a pixel under determination for accordingly generating the fused depth map, the first depth map being generated by decoding a captured image with a first kernel and the second depth map being generated by decoding a captured image with a second kernel that is different from the first kernel.

14. The method of claim 13, further comprising:

processing the captured image after decoding the captured image by the depth decoder but before generating the fused depth map.

15. The method of claim 14, wherein the fused depth map is generated further according to confidence levels that are derived from the step of processing the captured image.

16. The method of claim 13, wherein the step of generating the fused depth map comprises:

comparing the depth difference with a predetermined threshold, thereby resulting a comparison result.

17. The method of claim 16, wherein the step of generating the fused depth map further comprises:

selecting between the first depth map and the second depth map at the pixel under determination according to the comparison result, thereby generating a fused depth value for the fused depth map at the pixel under determination.

18. The method of claim 17, wherein a depth value of a depth map with larger kernel is selected as the fused depth value for the fused depth map when the depth difference is greater than the predetermined threshold.

19. The method of claim 16, wherein the step of generating the fused depth map further comprises:

generating a weighted sum of the first depth map and the second depth map at the pixel under determination according the comparison result.

20. The method of claim 19, wherein a larger weight is adopted for a depth map with larger kernel when the depth difference is greater than the predetermined threshold.

* * * * *